United States Patent [19]

McKenzie

[11] 3,961,081
[45] June 1, 1976

[54] MOLASSES FEED BLOCK FOR ANIMALS AND METHOD OF MAKING SAME

[76] Inventor: Carl O. McKenzie, 251 Altura Drive, Fullerton, Calif. 92632

[22] Filed: Mar. 12, 1974

[21] Appl. No.: 450,410

Related U.S. Application Data

[63] Continuation of Ser. No. 259,533, June 5, 1972, which is a continuation-in-part of Ser. No. 850,226, Aug. 14, 1969, abandoned.

[52] U.S. Cl. .............................. 426/658; 127/29; 127/58; 426/471; 426/515; 426/520; 426/807
[51] Int. Cl.² ........................................ C13F 3/00
[58] Field of Search ............ 127/58, 59, 29; 426/69, 426/205, 210, 213, 378, 380, 465, 512, 520, 524, 74, 658, 443, 471, 807, 522, 521

[56] References Cited
UNITED STATES PATENTS

| | | | |
|---|---|---|---|
| 1,983,434 | 12/1934 | Black | 99/6 |
| 2,089,062 | 8/1937 | Hougland | 127/58 |
| 2,603,567 | 7/1952 | Stiles | 99/2 |
| 2,712,516 | 7/1955 | Kool | 195/48 |
| 3,230,902 | 1/1966 | Grimm | 99/6 |
| 3,246,336 | 4/1966 | Baribo | 99/6 |
| 3,248,224 | 4/1966 | Loomis | 99/2 |
| 3,532,503 | 10/1970 | Kviesitis | 99/6 |
| 3,660,104 | 5/1972 | Godbold | 99/6 |

FOREIGN PATENTS OR APPLICATIONS 205,187    8/1956    Australia
630,521    5/1936    Germany

*Primary Examiner*—Hiram H. Bernstein
*Attorney, Agent, or Firm*—Gausewitz, Carr & Rothenberg

[57]                    ABSTRACT

A high energy feed supplement for animals in the form of a block that is dense, non-porous, hard, and vitreous in nature, the block embodying molasses solids as a primary structural and nutritional constituent, and in general providing the ingredients and advantages of a liquid feed supplement in solid form. According to the method of the invention a liquid body of the molasses feed composition is heated at substantially ambient pressure in a temperature range substantially in excess of the boiling point of water but not so hot as to damage the molasses solids or other heat-vulnerable ingredients such as vitamins, so as to remove a major portion of the water content of the composition without foaming therein, and then the composition is subjected to a vacuum without further temperature increase, and preferably while being allowed to cool so as to further reduce the water content without foaming and thereby conditioning the solids in the molasses so that the composition when subsequently poured into molds quickly solidifies into dense, non-porous, hard, vitreous blocks.

16 Claims, No Drawings

MOLASSES FEED BLOCK FOR ANIMALS AND METHOD OF MAKING SAME

This application is a continuation of application Ser. No. 259,533, filed June 5, 1972, for Molasses Feed Block For Animals and Method of Making Same, which, in turn, is a continuation-in-part application of Ser. No. 850,226, filed August 14, 1969, for Molasses Feed Block For Animals and Method of Making same.

BACKGROUND OF THE INVENTION

High energy feed supplements are currently extensively employed in the raising of cattle, sheep, and other domestic animals. These feed supplements include such materials as molasses, fat, and urea, and these materials are usually sold separately and mixed by the animal feeder with such feeds as grains or mixed feeds.

For more convenient handling and distribution, various high energy feed supplement materials have heretofore been combined in two distinctive composite forms, namely, in the form of a liquid feed supplement, and in the form of a block type of feed supplement. However, both of these prior art types of composite feed supplement preparations have involved serious problems in production, handling and usage, and have been undesirably limited in the amounts of certain feed supplement substances which could be contained therein.

Thus, prior art liquid feed supplements have been available which contain a large percentage of molasses for high energy content, and which also contain a substantial amount of urea as a source of nitrogen for protein equivalent. However, the amount of fat content which could be provided in such prior art liquid feed supplements is severely limited, and is much less than is desirable for an optimum feed supplement composition. The biggest difficulties in connection with prior art liquid feed supplements have been in the handling and ultimate use thereof. Thus, special tanks are required for storage of liquid feed supplements, and tank trucks are required for primary distribution thereof. Additionally, putting such liquid feed supplements out for consumption by cattle or other domestic animals presents a very serious problem, as open troughs of the sweet, sticky liquids attract flies and other undesirable insects. Accordingly, special closed liquid feed dispensing containers have been required which meter the liquid feed supplement material out through mechanical devices. Even when thus dispensed, cattle tend to get the sweet, sticky feed supplement liquid all over their faces, which draws flies and is accordingly unsanitary.

Block types of animal feed supplements have heretofore been produced by combining chopped alfalfa, straw, or grains, and proteins, with from about 10% to about 30% molasses in a mixer, and then pressure forming the combination under extremely high pressure, as for example about 100 tons per square inch. This prior art method of forming block feed supplements involves the use of very costly machinery, and labor is also quite costly as it is principally a hand operation. In such prior art feed supplement blocks the maximum percentage of molasses which can be satisfactorily combined in the mixture is only about 3:%, as combinations with larger percentages of molasses are too much of a gooey mess for satisfactory pressure forming. Similarly, the amounts of fat which could be contained in such pressure formed feed supplements were inadequate.

In general, it is desirable in a feed supplement for animals to include a relatively large percentage of molasses, because of the high content of inverted sugars therein (over 50%), because of the good mineral content, and in particular because of the large amount of energy available cheaply. A substantial amount of fat has also been found to be desirable in such feed supplements. While prior art liquid feed supplements were able to obtain an adequate amount of molasses, they were generally deficient in the desirable amount of fat, and were difficult to handle and use. On the other hand, while prior art block type feed supplements were much more convenient to use, they were deficient in both the amount of molasses they could contain and the amount of fats they could contain, and they have the further disadvantage of undesirably high production cost and investment in machinery.

Prior to the method of the present invention wherein the molasses is first heated at substantially ambient pressure to remove a major portion of the water content thereof and then without further heating subjected to a vacuum to further reduce the water content without foaming, there has been no method in the art capable of producing dense, hard, vitreous molasses feed blocks, and particularly such blocks wherein substantial quantities of other important animal feed ingredients are integrally combined in such blocks with the molasses solids serving as a supporting matrix.

Molasses has heretofore been dried by vacuum methods for animal feed purposes. However, prior art methods of this type were directed to the drying of the molasses for later mixing with other feed ingredients, and did not produce a dense, hard, vitreous molasses feed block; nor were they capable of producing such a block. Examples of such prior art vacuum drying methods were the methods described in U.S. Pat. No. 1,983,434, issued Dec. 4, 1934 to Black et al, and U.S. Pat. No. 2,089,062 issued Aug. 3, 1937 to Hougland.

In the Black et al patent, prior to the removal of any water from the molasses, it was passed into a high speed vacuum evaporator at low temperature (150° to 160° F.), in which most of the water was removed, and then it was heated to between 200° F. and 238°F. and spray dried. The purpose of the Black et al method was to avoid having to mix the molasses and other feed ingredients while the molasses was in its liquid form, because the stickiness of the molasses made mixing so difficult.

In the Hougland patent, a thin film of molasses was applied to a heated surface in an evacuated drum, so that the vacuum was applied to the molasses prior to and during the heating thereof, and hence before the removal of any of the water from the molasses. The purpose of the Hougland method was to dry the molasses so that when it was later mixed with other feeds it would not be subject to fermentation.

The application of vacuum for drying before the removal by heating of any water from the molasses in the Black et al and Hougland methods precluded the formation of dense, hard, vitreous feed blocks by such methods; and also precluded the inclusion of other feed materials with the molasses when it was being treated, and hence precluded the integral inclusion of other feed materials within a matrix of hard molasses.

Such prior art methods also were rather severely limited in production rate because of the tendency of the molasses to swell and foam when thus subjected to the vacuum with initial water content, making animal feed production by such methods generally costly and inefficient.

SUMMARY OF THE INVENTION

In view of these and other problems in the art, it is an object of the present invention to provide a novel high energy feed supplement composition which is in the form of a block for convenient handling, and which embodies molasses solids as a primary structural and nutritional constituent thereof, the molasses solids providing on the one hand a highly desirable high energy, low cost feed supplement material, and on the other hand providing a dense, non-porous, rigid, generally vitreous structural matrix without the high equipment and labor cost of pressure forming.

Another object of the invention is to provide a rigid block type high energy feed supplement for animals which contains preferably from about 50% to about 100% molasses, and which provides a suitable rigid medium for containing a variety of additional feed supplement materials, including but not limited to such supplements as urea, salt, fat in a variety of forms, calcium, phosphate, various minor or trace elements and vitamins, clay or silicate materials in small quantities, and plant roughage materials.

Another object of the invention is to provide a novel method of making feed supplement block for animals which includes the steps of providing a supplement mixture embodying molasses as a primary constituent, and utilizing a hardening capability of the molasses to give the composition a rigid, generally vitreous characteristic. The molasses, and with it the entire composition, is hardened by a method that is generally the opposite of conventional methods employed to make animal feeds which contain molasses. According to the present method, the molasses feed composition is first heated at substantially ambient pressure to a temperature within a range of from about 225°F. to about 300°F., which is substantially in excess of the boiling point of water but not so hot as to damage the molasses solids or other heat vulnerable ingredients such as vitamins, so as to drive off a major portion of the water content of the composition without substantial foaming therein, and then subjecting the composition to a vacuum without further increasing the temperature of the composition, and preferably while allowing the composition to cool, so as to further reduce the water content without substantial foaming, thereby conditioning the solids in the molasses so that the composition when allowed to cool below the melting point of the molasses solids will quickly acquire the dense, nonporous, hard, vitreous physical characteristics of the present product.

Another and more general object of the invention is to provide a molasses feed block for animals of the character described which is simple and economical to produce, is particularly high in energy content, permitting more energy to be provided for a given amount of protein and minerals than can be provided in other feed supplement blocks, is palatable and readily consumed, yet easy to control in consumption, and which is easy to handle in storage and transportation and simple to put out for feeding, and which is relatively easy to keep sanitary.

A further object of the present invention is to provide a new method of making a molasses feed block for animals, and the resulting product, wherein foaming and swelling are so minimized or substantially completely avoided during heating and vacuum application steps of the process that the product is very dense and is substantially non-porous and impermeable to penetration by moist air. In this manner the hygroscopic characteristic of the molasses is only available to moist air at the outer surfaces of the blocks, to produce a gradual surface softening of the blocks to make them available to animals at a controlled rate. In contrast, if the blocks were substantially porous, the hygroscopic activity would extend internally of the blocks and quickly reduce the blocks to a sticky mess, preventing proper metering of the energy content thereof to the animals.

In general, the molasses feed blocks according to the present invention permit an improved liquid feed composition to be provided in solid block form with all of the advantages of both prior art liquid and prior art solid feed supplement compositions, yet with none of the principal disadvantages of Other objects and advantages of the present invention will appear during the course of the following part of the specification, wherein the compositions and method steps of presently preferred embodiments are described in detail.

DETAILED DESCRIPTION

Molasses forms both the primary structural basis for feed supplement blocks according to the invention and the primary nutritional basis for the blocks. In order to achieve the best structural characteristics and also the best nutritional values, it is preferred according to the invention to embody from about 50% to about 100% molasses in the feed blocks. This can then form the basis for a wide variety of feed supplement compositions according to the invention, and as will be seen from the examples set forth in detail hereinafter, the applicant has successfully produced blocks in accordance with the invention which are entirely molasses, are a combination of molasses and salt, a combination of molasses and fat, a combination of molasses and urea, a combination of molasses, fat, and urea, and each of the foregoing combinations to which various essential vitamins and minerals have been added.

Regardless of whether the feed block to be produced according to the invention is entirely molasses, or is some combination of molasses and one or more other ingredients, hardening of the molasses content, and hence of the blocks themselves, can be reliably and uniformly accomplished by the same series of method steps. While the present invention is not limited to a minimum of 50% molasses content of the feed blocks, the applicant has found in experimental practice that the desired rigid, vitreous physical characteristics of the blocks can be reliably achieved when a minimum of about 50% molasses is embodied in the combination.

According to the method of the present invention, a substantial body of the molasses feed composition, which comprises molasses with or without added ingredients, is first heated to a temperature within the range of from a minimum of about 225°F. to a maximum of about 300°F. The preferred temperature range to which the molasses feed composition is heated is from about 260°F. to about 285°F., and the preferred temperature is about 270°F.

Extensive testing has indicated that time is not a criterion of the heating step as there appears to be a fixed relationship between the percentage of the water content of the molasses portion of the composition which remains in association with the molasses solids and the temperature to which the composition is elevated in the heating step, regardless of the tire required to raise the composition to such temperature. In practice, the time required to raise the composition to the operative temperature will depend primarily upon the size of the body of the molasses feed composition being heated, and the equipment used for heating it.

Generally, the larger the mass of the composition being heated, the longer the time that is required to avoid the development of any "hot spots" in the mass. The molasses solids are vulnerable to high temperatures, and if any "hot spots" were allowed to develop in the mass being heated, then there is a danger of damaging some of the molasses solids and of introducing a negative property to the end product. In addition to controlling the rate of heating, it is helpful in avoiding undesirable "hot spots" to agitate or stir the body of the composition as it is being heated.

It is critical in order to provide the durable, nonporous, hard, vitreous blocks of the present invention that the heating step be performed without substantial foaming of the composition. During the heating step, large quantities of water will be disassociated from the molasses portion of the composition, but this must be by means of a normal boiling type of bubbling action wherein large bubbles rise generally intact through the mass to be liberated at the surface of the mass. In order to assure such normal boiling type of liberation of the water vapor from the mass during the heating step, the heating is normally performed at ambient pressure, and any use of a reduced pressure vessel is avoided. Thus, in performing the heating step of the invention, the body of the composition will normally be disposed in a vessel providing open communcation to the atmosphere.

Carrying the heating step to the proper extent under a substantially non-vacuum condition is an important aspect of the present invention. It is essential that the bulk or major portion of the water content of the molasses be removed by the heating step prior to the application of the vacuum step to avoid foaming and swelling of the composition. On the other hand, it is also essential that the final portion of the water content of the molasses that is removed be disassociated from the molasses by the vacuum step applied without application of further heat; as heating without the final vacuum step will result in damage to the molasses solids, as well as to other vulnerable ingredients that may be present such as vitamins, and will not produce final blocks of that hard, vitreous, glassy character required to avoid internal hygroscopic activity and consequent premature breakdown in the field.

In removing the bulk or major portion of the water content of the molasses by heating, the heating step is applied until the temperature of the composition is raised to that value at which, without further temperature increase, a high vacuum can be applied to the composition without any substantial foaming or swelling of the composition. The actual amount of water thus removed from the molasses will depend on the Brix of the molasses used in the composition, but regardless of what Brix molasses is used, the final temperature required will vary according to the quality and type of molasses used. All types of molasses will fall within the temperature ranges set forth hereinabove, and cane molasses will fall within the preferred range.

The heating step is stopped short of that point at which the molasses would, if then cooled without the subsequent vacuum step, cool to a hard or crystalline body. Thus, the heating is stopped at a temperature which would leave the composition in a formable or plastic condition upon cooling to ambient temperature without the subsequent vacuum step. Defined in terms of the moisture content of the molasses remaining after the heating step, the heating step is normally stopped before the water content has been reduced below about 5% of the molasses content of the composition.

It is to be noted that the heating step is not materially altered by the presence of other feed ingredients with the molasses, since such other ingredients are not generally involved with the association of the molasses solids and the molasses water. Thus, for example, if the composition has 30% fat, this will not affect the temperature of the heating step which will apply to the molasses content just the same as it would without the presence of the fat. Additionally, such percentage of fat in the composition will not substantially alter the heating time of a given mass of the composition, as the specific heat of fat is generally at least about as high as that of molasses.

Upon completion of the aforesaid heating step, the composition is now ready for application of the vacuum step of the process. The vacuum step comprises subjecting substantially all portions of the heated, fluid body of the composition to a substantial vacuum without the addition of further heat to the composition.

It has been determined that the amount of time that the vacuum is applied is not a criterion of the invention, but that it is essential to apply the vacuum to substantially all portions of the composition. Accordingly, the time required for the vacuum step will be determined by the time that is required to expose substantially all of the still-fluid composition to the vacuum.

Exposure of substantially all portions of the fluid to the vacuum can be accomplished in any desired way. One particularly practical way to in effect "open up" the fluid to the vacuum is to stream the fluid as a sheet or curtain in the presence of the vacuum. Such a sheeting action can readily be accomplished by flowing the fluid composition over a ledge of any desired configuration in a vacuum chamber at a rate slow enough so that a relatively thin sheet is exposed to the vacuum rather than a thick stream. One simple way of accomplishing this is to flow the composition from an open heating vessel into a closed vacuum vessel at a slow enough rate so that the desired amount of vacuum can be maintained in the vacuum vessel and the fluid can be sheeted in a thin curtain and thereby be generally fully exposed to the vacuum as it flows into the vacuum chamber. The fluid can be flowed through a long, thin, slit-like orifice into the vacuum chamber for sheeting, or can be flowed through any shape orifice and then sheeted over any ledge or other obstruction in the vacuum chamber.

An important aspect of the vacuum step of the invention is that the temperature of the composition not be allowed to have any substantial increase during the vacuum step. It is preferred according to the invention to allow the composition to cool during the vacuum step so as to avoid any possibility of foaming or swelling. Such cooling will be caused by a combination of loss of heat of vaporization from water that is vaporized and removed by the vacuum applying means, and of conduction through the walls of the vacuum vessel and then radiation therefrom. If desired, the cooling can be retarded during the vacuum step so that the composition will not become too viscous to transport to molds and flow into the mold configuration. Such retardation can be by insulation of the vacuum vessel or by steam jacketing thereof, or by other suitable means preferably but not necessarily allowing the temperature to decrease from the heating step, and if allowing the temperature to decrease, not permitting it to become so low that the mass becomes unmanageable prior to being molded.

Thus, no heat is added to the composition during the vacuum step, and preferably heat is allowed to leave the composition during the vacuum step.

The vacuum is applied to the composition until the water content of the molasses portion thereof is substantially reduced from the water content that remained after the end of the heating step, and until the molasses portion of the composition does not contain more than about 5% of water, and preferably not more than about 3% water.

The vacuum step is applied to a sufficient extent so as to pull out that last increment of water remaining in the molasses portion after the heating step so that on final cooling to below the melting point of molasses solids the composition will harden to hard, brittle, glass-like consistency. It appears that the vacuum step causes microcrystallization of some of the sugars in the molasses, and this appears to be a factor assuring the uniformly hard, vitreous quality of the final product. Proper application of the vacuum step is indicated by the characteristic of the final product that it breaks in a manner very similar to glass.

Molasses feed blocks thus produced are slowly soluble in water from the surfaces only, and the surfaces thereof will soften when dampened. Accordingly, the feed blocks are readily but relatively slowly consumed by licking and chewing thereof. An important factor in rendering the blocks desirable for consumption is that the hardened molasses has a hygroscopic quality, causing surface portions of the blocks to open up and become desirably moist.

The molasses which is employed for producing feed blocks according to the invention is preferably cane molasses and preferably has a specific gravity between about 70 and about 90 Brix, which is readily available in tankers or in drums. High Brix molasses as it comes out of a sugar plant is generally from about 85 to about 90 Brix, while molasses as it is normally handled in feed mills is about 79 ½ Brix. As indicated above, the method of the present invention is not altered regardless of what the specific gravity of the molasses employed may be. Citrus molasses, beet molasses, or wood molasses may alternatively be employed as the basis for the feed blocks of the present invention.

The following are examples of some of the products which the applicant has produced according to the invention. It is to be understood that these products are given by way of example only, and not by way of limiation.

EXAMPLE I

Molasses Block (no additives)

105 pounds of molasses (about 135 pounds of liquid molasses of 70 to 82 Brix specific gravity) was heated to elevate its temperature to within the range of from about 221°F. (105°C.) and about 321°F. (155°C.), preferably about 270°F. (132°C.), after which time a vacuum was drawn on the boiling product. A vacuum of about 29 inches of mercury has generally been employed by the applicant, but substantial variations in the amount of vaccum can be employed within the scope of the invention which is accordingly not limited to any specific amount of vacuum. The greater the vacuum applied, the more rapidly and reliably the product appears to harden, and it is accordingly preferred to have a relatively high vacuum condition such as about 29 inches of mercury, although a vacuum in the range of about one-fifth atmosphere or greater (i.e., approximately 24 inches of mercury or greater) is generally suitable.

The amount of evaporation of moisture is controllable by the extent of vacuum application to the composition, and when the vacuum is broken, the hot molasses is immediately cast e.g. poured into molds of any configuration, in which the molasses will set up and harden into cast blocks within a short period of time. From the 105 pounds of molasses solids (approximately 135 pounds of liquid molasses), a yield of approximately 100 pounds of hard block results. The resulting material is seemingly glassy or vitreous in nature, and it is so hard that it will shatter when struck with a mallet or dropped from a substantial height.

For cattle feeding or shipping, the blocks are preferably formed into units between about 20 and 100 pounds each in weight.

Since a block according to this example is 100% molasses solids, with no additives, it is not only suitable as a feed supplement, but it can be also be employed as a convenient means for transporting and storing molasses without requiring the use of tankers or drums. Since these blocks have no excess moisture such as is required for liquification thereof, they are of minimum weight for shipping. Additionally, by making the blocks in the shape of a cube or other regular solid shape, shipping and storing space can be minimized.

EXAMPLE II

Molasses-Salt Block

Molasses is placed in a kettle and salt, which can be sodium chloride or a mixture of sodium chloride and other salts, to produce a starting salt percentage of from about 1% to about 10% of salt, is added to the molasses. As in Example I, this combination is heated preferably to about 270°F. (132°C.), with stirring, at which time the vacuum is drawn upon the composition, and then when the vacuum is broken the heated, liquid mixture is poured into molds. The blocks are hard and of crystalline consistency within a short period of time. These blocks have been tested in cattle feeding, and a molasses-salt block containing approximately 5% salt appears to be most acceptable and accordingly is preferred.

EXAMPLE III

Molasses-Fat Block

It has been found desirable to include some fat in the feed blocks as an excellent source of highly concentrated energy. Accordingly, any of a variety of fats can be embodied in the molasses feed block to provide such additional concentrated energy. Suitable fats are tallow, acidulated soap stock, cottonseed, corn or soy oil residue, or mixtures of these and other suitable fats.

The molasses-fat block preferably has a fat content up to about 30% of the total block, with a preferred range of from about 5% to about 20% fat. Small amounts of suitable antioxidants may also be included, such as BHA, BHT, and others, alone or in mixtures.

The method steps for producing the molasses-fat blocks are identical with those set forth in Examples I and II above, One specific example involved mixing about 99 pounds of molasses solids (about 130 pounds of about 70 to 82 Brix molasses) with about 5 pounds of feed fat, resulting in approximately 100 pounds of finished feed supplement block of about 5% fat composition.

While specific examples of fats have been set forth, it is to be understood that a variety of other fats or other oils can be employed, including both hydrogenated and non-hydrogenated oils of animal and vegetable origin.

Molasses-fat blocks according to the present invention have a unique characteristic of providing an association between the fat and the molasses which appears to be more intimate than just a simple mixture. This becomes apparent when a molasses-fat block according to the invention is later put into aqueous suspension, in which case the fat does not readily separate from the molasses as it would if they had not previously been reduced to the block form.

EXAMPLE IV

Molasses-Fat-Urea Block

Urea can be used as a source of nitrogen for ruminant animals, and each percent of urea of 45% nitrogen yields the approximate equivalent of 2.8% protein. By including from about 3.56% to about 14.2% urea in the blocks, a protein equivalent range of from about 10% to about 40% is included in the blocks. A preferred percentage range is a protein equivalent of from about 20% to about 25%, which is provided in the form of about 7.1% to about 8.9% urea.

Combinations of molasses and urea alone have proven satisfactory in testing, but the more successful urea-containing blocks in feeding have proven to be blocks which also include some feed fat. One particular example included a mixture of about 87 pounds of molasses solids (about 120 pounds of 70 to 82 Brix molasses), about 5 pounds of feed fat, and about 8.4 pounds of urea. This mixture was processed in the same manner as Example I, and the resulting blocks totaled approximately 100 pounds, with about 5% fat and about 22% protein equivalent.

The present molasses feed blocks have been found to be an excellent vehicle for biuret, a polymerized urea, which is an excellent feed material, but which separates out of liquid molasses feed compositions.

Another source of nitrogen which may be provided as a protein equivalent in the blocks is suitable ammonium salts, which may be provided with or without urea, and which preferably are included to provide a protein equivalent of from about 10% to about 40%, with an optimum protein equivalent in the range of from about 20% to about 25%.

EXAMPLE V

Molasses-Fat-Protein Equivalent-Phosphate Block

In feed blocks for ruminant animals it is desirable to include some phosphate, and where the phosphate is included it is preferable to maintain a calcium-to-phosphorous ratio of about 2 to 3 parts of calcium to each part of phosphorous. Calcium and phosphorous can be supplied by adding meat and bone meal, fish meal, calcium phosphates, including mono-calcium, di-calcium, and tri-calcium phosphates, or by other means. Ammonium phosphate can be included as a source of nitrogen and of phosphorous, and calcium carbonate can be employed with added phosphates.

A specific example of a molasses-fat-protein equivalent (urea of ammonium salt or both)-phosphate block composition, including calcium, has been prepared in accordance with the steps set forth in Example I, with a final block composition as follows: 2% to 3% calcium, 1% phosphorous, 2% to 5% salt, 5% fat, 20% to 25% protein equivalent, the remaining percentage molasses.

EXAMPLE VI

Molasses Block with Minor elements and Vitamins Added

Although molasses is a rich source of trace elements, it is desirable to supplement any or all of the formulations set forth hereinabove with both trace elements and vitamins, the trace elements preferably being provided in chloride or sulfate form. A preferred range of content for trace elements is as follows:

| | | |
|---|---|---|
| Manganese | 4.54 to 18.16 mg/lb | (0.001 – 0.004%) |
| Iodine | 4.54 to 18.16 mg/lb | (0.001 – 0.004%) |
| Zinc | 4.54 to 18.16 mg/lb | (0.001 – 0.004%) |
| Copper | 4.54 to 13.62 mg/lb | (0.001 – 0.003%) |
| Cobalt | 4.54 to 9.08 mg/lb | (0.001 – 0.002%) |
| Iron | 181.6 to 363.2 mg/lb | (0.04 – 0.08%) |

The preferred vitamin additives are as follows:

| | |
|---|---|
| Vitamin A | 5,000 – 40,000 units/lb |
| Vitamin D | 2,000 – 6,000 units/lb |
| Vitamin E | 5 – 50 units/lb (when used) |

Control of trace element and vitamin intake of the animals can conveniently be established either by increasing the salt content of the blocks or by increasing the fat content thereof. As the salt increases the effect is self-limiting, but the animal may not secure the entire quantity of nutrients desired. By increasing the fat content of the blocks to about 10%, there is a satiating effect upon the animals, so that they have little or no desire to eat more than 1 to 3 pounds per day, depending on the size of the animals.

EXAMPLE VII

Addition of Kaolin, Bentonite or Other Clay or Silicate Materials

It has frequently been the custom to add from 0.5% to 2.0% kaolin or other clay or silicate material to the diet of the animal. This is particularly important under some feedlot conditions, and of less importance in range-fed animals, such as cattle. Where conditions are such that it is desirable to include such materials in the feed, they may conveniently be included in the feed blocks of the present invention, without varying the method of production of the blocks. Thus, the procedure set forth in Example I may be employed. However, such materials are preferably provided in blocks which are completely supplemented, as for example the blocks of Example VI, the kaolin or similar material being stirred into the mixture while it is being heated. Due to the fact that such silicate materials hydrate taking up remaining water, the product must be poured more rapidly after the vacuum is broken than with some of the other compositions according to the invention, to prevent the material from setting up in the container.

These inert additives are generally added to produce a certain amount of natural bulk in the animal diet, and they will hereinafter be collectively referred to as clay-like materials, it being understood that they include but are not limited to such clay-like materials as kaolin, bentonite, microsil, and other clay and silicate materials.

EXAMPLE VIII

Molasses Block with Added Plant Feed Materials

Since the principal purpose of the molasses feed supplement blocks of the present invention is to furnish the animals a large amount of energy and growth materials in the smallest and most convenient possible package, it is normally not desirable to add conventional plant feed materials to the composition of the blocks. However, it is to be understood that such materials can be included within the scope of the invention, provided the percentage thereof is relatively low so as to not defeat the self-forming quality of the composition when it is poured into the molds. Such added plant feed materials may include such things as ground grains, chopped or ground alfalfa, the meals such as coconut meal or seed meals including cottonseed, soya, sesame or linseed meals, or brewers dried grains, or chopped or ground straw, corncobs, cottonseed or other hulls, wheat or rice bran, or in general other plant components.

While the present invention has been described herein in what are conceived to be the most practical and preferred embodiments, it is recognized that departures may be made therefrom within the scope of the invention, which is therefore not to be limited to the details disclosed herein.

I claim:

1. The method of making generally non-porous, hard, vitreous feed blocks for animals which comprises the steps of providing a fluid feed composition having a molasses content in the range of from about 50% to 100% of the total composition, heating said fluid composition at substantially ambient pressure and without substantial foaming in the composition to a temperature within a range of from about 225°F. to about 300°F. so as to drive off the major portion of the water content of the molasses in the composition, subjecting substantially all portions of said heated, fluid composition to a substantial vacuum without substantial further temperature increase so as to further substantially reduce the water content of the molasses in the composition, forming said composition into blocks of about 20 to 100 pounds weight while it is still sufficiently hot to be formable, and allowing the composition to cool until it hardens into formed blocks.

2. The method of claim 1, wherein said heating step is stopped before the water content of the molasses in the composition has been reduced below about 5% of the molasses content of the composition.

3. The method of claim 1, wherein said heating step is stopped at a temperature that would leave the composition in a formable condition upon cooling to ambient temperature without said vacuum step.

4. The method of claim 1, wherein the composition is raised in said heating step to a temperature within a range of from about 260°F to about 285°F.

5. The method of claim 1, wherein the composition is raised in said heating step to a temperature of about 270°F.

6. The method of claim 1, wherein said heated, fluid composition is opened up to exposure to said vacuum by flowing the composition in a sheet-like stream in the presence of the vacuum.

7. The method of claim 1, wherein said vacuum step is applied until the water content of the molasses in the composition is not more than about 5% of the molasses content of the composition.

8. The method of claim 1, wherein said vacuum step is applied until the water content of the molasses in the composition is not more than about 3% of the molasses content of the composition.

9. The method of claim 1, wherein the temperature of the composition is allowed to decrease during said vacuum step.

10. The method of claim 9, wherein said temperature decrease during said vacuum step is retarded so that the composition will remain sufficiently fluid at the end of said vacuum step for forming the composition into blocks.

11. The method of claim 1, wherein said vacuum is about 24 or more inches of mercury.

12. The method of claim 1, wherein said vacuum is about 29 inches of mercury.

13. A rigid feed block for animals made by providing a fluid feed composition having a molasses content in the range of from about 50% to 100% of the total composition, heating said fluid composition at substantially ambient pressure and without substantial foaming in the composition to a temperature within a range of from about 225°F. to about 300°F. so as to drive off the major portion of the water content of the molasses in the composition, subjecting substantially all portions of said heated fluid composition to a substantial vacuum without substantial further temperature increase so as to further substantially reduce the water content of the molasses in the composition, forming said composition into blocks while it is still sufficiently hot to be formable, and allowing the composition to cool until it hardens into formed blocks.

14. A rigid feed block for animals which comprises a solidified body of molasses that is of substantially non-porous, hard, vitreous consistency, the molasses content of said block being within the range of from 50% to 100% and there being no more than 5% water in the molasses portion of the block, said body being a molded body of a cooled and hardened mixture of heated liquid molasses, said body being both hygroscopic and impermeable to penetration of moisture inwardly of the outer surface thereof, said solidified body being made by heating a fluid mixture of molasses at substantially ambient pressure to a temperature above about 225°F. so as to drive off the major portion of the water content of the molasses, further dehydrating the heated mixture by subjecting it to a substantial vacuum without substantial temperature increase, and pouring the further dehydrated mixture into a mold for cooling and hardening.

15. The rigid feed block of claim 14 wherein said temperature is not greater than about 300°F. and wherein said major portion of the water content has been driven off by a boiling type of bubbling action.

16. A rigid feed block for animals made by the method of claim 1, the molasses content of said block being within the range of from about 50% to 100% and there being no more than about 5% of water in the molasses portion of the block.

* * * * *

UNITED STATES PATENT OFFICE
CERTIFICATE OF CORRECTION

PATENT NO. : 3,961,081
DATED : June 1, 1976
INVENTOR(S) : Carl O. McKenzie

It is certified that error appears in the above-identified patent and that said Letters Patent are hereby corrected as shown below:

Col. 1, line 65   Change "3:%" to --30%--

Col. 4, line 19:  after "disadvantages of" add --either--

Col. 7, line 60:  Change "limia-" to --limita---

Col. 8, line 5:   Ch ange "vaccum" to --vacuum--

Col. 9, line 8:   Delete "," and insert --.--

Signed and Sealed this

Seventh Day of September 1976

[SEAL]

Attest:

RUTH C. MASON
Attesting Officer

C. MARSHALL DANN
Commissioner of Patents and Trademarks